(12) United States Patent
Christensen et al.

(10) Patent No.: US 7,457,300 B2
(45) Date of Patent: Nov. 25, 2008

(54) ETHERNET ADDRESS MANAGEMENT SYSTEM

(75) Inventors: Peter Skov Christensen, Struer (DK); Kim Hyldgaard, Sunds (DK); Torben Melsen, Holstebro (DK)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 848 days.

(21) Appl. No.: 10/756,969

(22) Filed: Jan. 14, 2004

(65) Prior Publication Data

US 2004/0141468 A1 Jul. 22, 2004

Related U.S. Application Data

(60) Provisional application No. 60/441,538, filed on Jan. 21, 2003.

(51) Int. Cl.
*H04L 12/28* (2006.01)
*H04L 12/56* (2006.01)

(52) U.S. Cl. .................................................. 370/401

(58) Field of Classification Search ............ 370/397, 370/399, 409, 395.54, 389, 392
See application file for complete search history.

(56) References Cited

U.S. PATENT DOCUMENTS

| | | | | |
|---|---|---|---|---|
| 5,617,421 A | * | 4/1997 | Chin et al. | 370/402 |
| 2003/0039260 A1 | * | 2/2003 | Fujisawa | 370/401 |
| 2003/0130833 A1 | * | 7/2003 | Brownell et al. | 703/23 |

* cited by examiner

*Primary Examiner*—Hassan Kizou
*Assistant Examiner*—Betty Lee

(57) ABSTRACT

A method and system for mapping original Media Access Control (MAC) addresses to unique locally administered virtual MAC addresses in an Ethernet network. An access node uses an address mapping function to map each original MAC address to one of a plurality of locally administered virtual MAC addresses, and vice versa. The six most significant bits of the first octet of the address are used to define a domain for the address, and the second-least significant bit of the first octet indicates that the address is a locally administered MAC address. The second and third octets of the address are used to indicate a unit-specific use. The last three octets of the address indicate an organizationally assigned unit-unique MAC address. Additional address mapping functions may map original addresses from different sources onto the same Ethernet network while maintaining the uniqueness of each virtual MAC address.

14 Claims, 4 Drawing Sheets

ETHERNET ADDRESS MANAGEMENT SYSTEM

BACKGROUND OF THE INVENTION

The present invention relates to digital communication systems. More particularly, and not by way of limitation, the invention relates to a system and method for managing locally administered Media Access Control (MAC) addresses in an Ethernet Local Area Network (LAN).

Ethernet is a packet-based transmission protocol that is primarily used in LANs. Ethernet is the common name for the IEEE 802.3 industry specification. Data is transmitted in Ethernet frames, and FIG. 1 is an illustration of a typical Ethernet frame 10. To synchronize the receiving node(s), each frame starts with 64 bits used only for synchronization, consisting of a 56-bit preamble 11 and an 8-bit Start of Frame Delimiter (SFD) 12. A destination address 13, a source address 14, and a length/type identifier 15 follow the preamble. Media Access Control (MAC) client data 16, together with a Packet Assembler/Disassembler (PAD) 17 may vary in length from 46 to 1500 octets. A Frame Check Sequence (FCS) 18 adds four more octets. The frame size is counted from the destination address to the FCS, inclusive, and thus may vary between 64 and 1518 octets, not including an optional Virtual Local Area Network (VLAN) tag, which adds 4 octets.

FIG. 2 is an illustration of a typical Ethernet destination and source address structure, known as a MAC address, as shown in IEEE 802.3, which is incorporated herein by reference. An I/G field 21 indicates whether the address is an individual or a group address. A zero (0) in this field indicates an individual address, while a one (1) indicates a group address (multicast). Note that a source address can only have a zero (0) in the I/G field. A U/L field 22 indicates whether the address is a universal or local address. A zero (0) in this field indicates a universally administered address, while a one (1) indicates a locally administered address. A destination address with all ones represents a broadcast address. The MAC address structure is completed with the actual address bits 23.

FIG. 3 is an illustration of a globally administered, Unit-unique MAC address 30, as shown in IEEE standard 802-1990, which is incorporated herein by reference. An Organizationally Unique Identifier (OUI) 31 is assigned to each global MAC address to ensure uniqueness. The OUI is a 3-octet hexadecimal number that is used as the first half of a 6-octet MAC address. An organization using a given OUI is responsible for ensuring uniqueness of the MAC address by assigning each produced unit its own unique 3-octet Unit-unique MAC address 32.

FIG. 4 is an illustration of a locally administered MAC address 40. IEEE standard 802.3 describes how to ensure unique MAC addresses for locally administered addresses by assigning "1" and "0" as the two least significant bits (LSB) of the first transmitted octet 41. These bits are also shown as 21 and 22 in FIG. 2. The bit "1" indicates that the address is a locally administered address, and the bit "0" indicates that it is a unicast address. However, IEEE standard 802.3 fails to disclose any method of ensuring unique locally administered MAC addresses when several nodes operate autonomously, or when several nodes belonging to separate solutions operate in the same Ethernet network utilizing locally administered addresses. The present invention provides a solution to this shortcoming.

SUMMARY OF THE INVENTION

It is therefore an object of the present invention to overcome the above mentioned problems and to provide a method of ensuring unique locally administered MAC addresses when several nodes operate autonomously, or when several nodes belonging to separate solutions operate in the same Ethernet network utilizing locally administered addresses. In this way, multiple nodes can operate autonomously, while assigning unique locally administered MAC addresses.

Thus, in one aspect, the present invention is directed to a method in an Ethernet network of mapping an original Media Access Control (MAC) address to a unique locally administered virtual MAC address. The method includes the steps of utilizing a first portion of the virtual MAC address to define a domain for the address; utilizing a second portion of the virtual MAC address to indicate that the address is a locally administered address; utilizing a third portion of the virtual MAC address to indicate a unit-specific use; and utilizing a fourth portion of the virtual MAC address to indicate an organizationally assigned unit-unique MAC address.

In yet another aspect, the present invention is directed to a system in an Ethernet network for mapping an original MAC address to a unique locally administered virtual MAC address. The system includes at least one address mapping function that maps inbound original MAC addresses from inbound Ethernet packets to one of a plurality of assigned locally administered virtual MAC addresses. The address mapping function includes means for utilizing a first portion of the virtual MAC address to define a domain for the address, means for utilizing a second portion of the virtual MAC address to indicate that the address is a locally administered address, means for utilizing a third portion of the virtual MAC address to indicate a unit-specific use, and means for utilizing a fourth portion of the virtual MAC address to indicate an organizationally assigned unit-unique MAC address.

The system may also include a MAC address database that stores unit-unique MAC addresses for all nodes in the network; means for accessing the MAC address database and for comparing the node's unit-unique MAC address against unit-unique MAC addresses that are already used in other nodes; and means within the address mapping function for defining a new MAC domain for the node's locally administered MAC address if the node's unit-unique MAC address has already been used in another node.

In still yet another aspect, the present invention is directed to a method of preventing subscriber spoofing in an Ethernet network. The method includes the steps of mapping an original MAC address to a locally administered virtual MAC address; and ensuring the locally administered virtual MAC address is unique. Uniqueness of each address is ensured by utilizing a first portion of the virtual MAC address to define a domain for the address; utilizing a second portion of the virtual MAC address to indicate that the address is a locally administered address; utilizing a third portion of the virtual MAC address to indicate a unit-specific use; and utilizing a fourth portion of the virtual MAC address to indicate an organizationally assigned unit-unique MAC address. The invention may be implemented in an address mapping function adapted to operate in an access node in an Ethernet network.

In still yet another aspect, the present invention is directed to a method in an Ethernet network of mapping an original MAC address to a unique locally administered virtual MAC address. The method includes the steps of utilizing a first portion of the virtual MAC address to define a domain for the address; utilizing a second portion of the virtual MAC address to indicate that the address is a locally administered address; and utilizing a third portion of the virtual MAC address to uniquely identify specific users within each MAC domain. This method may be used autonomously by 64 different systems or nodes if they each have their own MAC domain.

Alternatively, each node may consult a database to determine which addresses are available for use.

BRIEF DESCRIPTION OF THE DRAWINGS

In the following section, the invention will be described with reference to exemplary embodiments illustrated in the figures, in which.

DETAILED DESCRIPTION OF PREFERRED EMBODIMENTS

In the following description, for purposes of explanation and not limitation, specific details are set forth, such as particular embodiments, circuits, signal formats etc. in order to provide a thorough understanding of the present invention. It will be apparent to one skilled in the art that the present invention may be practiced in other embodiments that depart from these specific details.

Figure 1:
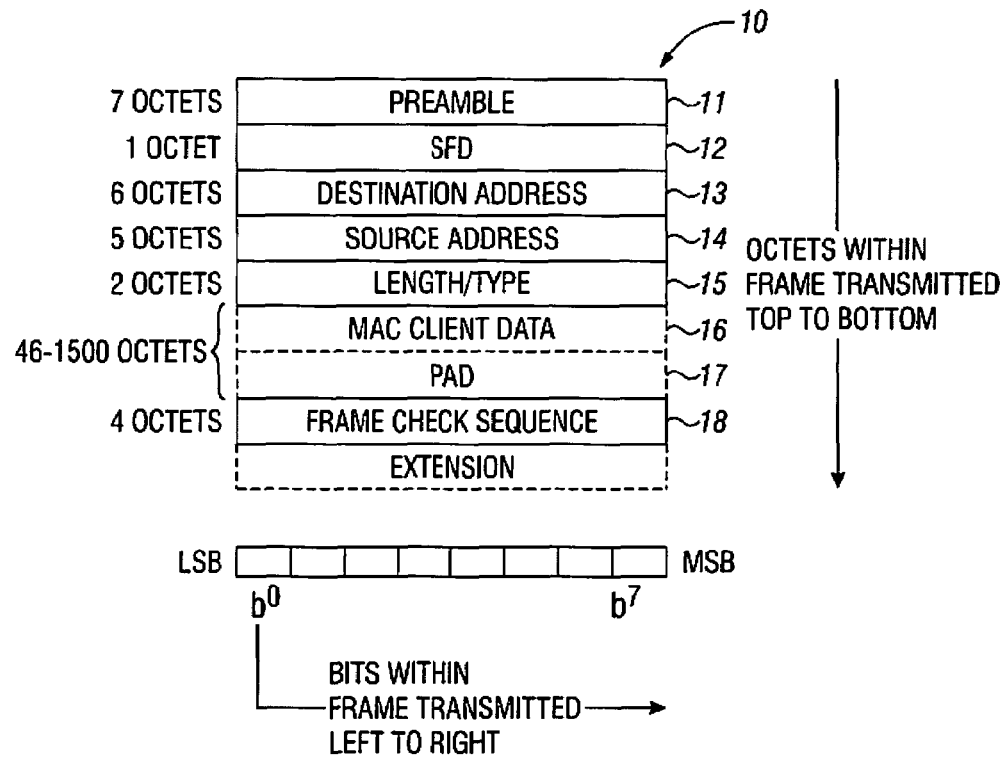
FIG. 1 (Prior Art) is an illustration of a typical Ethernet frame.
Figure 2:
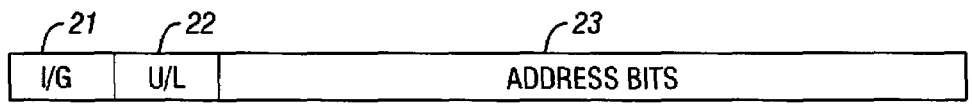
FIG. 2 (Prior Art) is an illustration of a typical Ethernet destination and source address structure, known as a MAC address.
Figure 3:
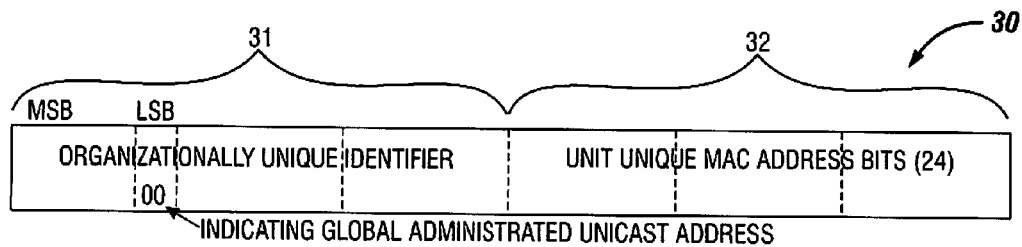
FIG. 3 (Prior Art) is an illustration of the layout of a typical globally administered, Unit-unique MAC address.
Figure 4:
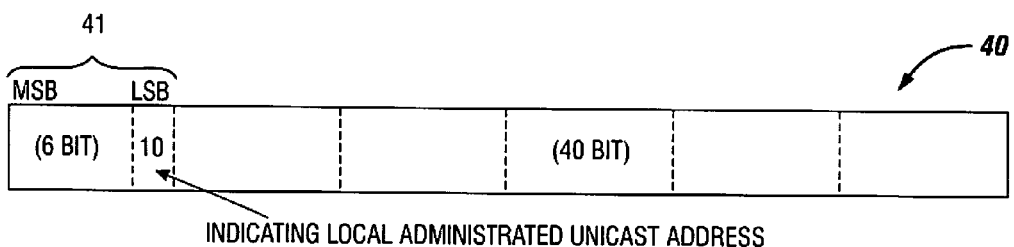
FIG. 4 (Prior Art) is an illustration of the layout of a typical locally administered MAC address.
Figure 5:
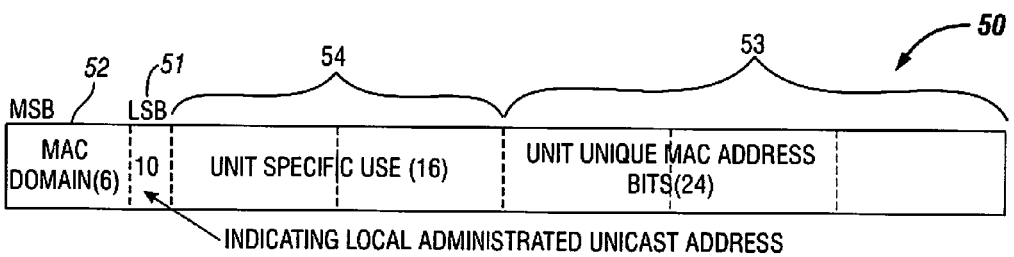
FIG. 5 is an illustration of the layout of a locally administered, Unit-unique virtual MAC address structured in accordance with the teachings of the present invention.

FIG. 5 is an illustration of a locally administered, Unit-unique virtual MAC address 50 structured in accordance with the teachings of the present invention. The present invention provides a method of providing unique locally administered MAC addresses when several nodes operate autonomously, or several nodes belonging to separate solutions operate in the same Ethernet network. As shown in FIG. 5, the last two bits 51 of the first octet may be assigned the values "1" and "0" to indicate that the address is a locally administered unicast address, as currently specified in IEEE 802.3. However, the first six bits 52 of the first octet are available, and the invention uses them to define domains for locally administered MAC addresses (referred to hereinafter as "MAC domains"). In this manner, 64 different domains may be defined, each of which may be combined with a node's organizationally assigned Unit-unique MAC address 53. Thus, the invention utilizes the node's Unit-unique MAC address and substitutes, for the OUI used in globally administered unicast addresses, an identification of a domain and an indication that the address is a locally administered unicast address. In this manner, the invention enables the node to utilize the remaining 16 bits 54 to assign unique locally administered MAC addresses.

Using the Unit-unique MAC address as part of a locally administered MAC address cannot, by itself, ensure unique addresses. Duplicate Unit-unique MAC addresses can occur when several organizations deliver equipment to be utilized in one network, or when equipment from the same supplier is delivered with a new OUI and a duplicate Unit-unique MAC address. The MAC domain of the present invention is utilized to distinguish these addresses and to ensure unique locally administered MAC addresses.

The MAC domain is preferably selected when installing and configuring network units. Several approaches may be used when assigning MAC domains to units. In one approach, nodes with different OUIs are assigned different MAC domains. In another approach, for each new node, the new node's Unit-unique MAC address is validated against Unit-unique MAC addresses that are already used in other nodes. If the new Unit-unique MAC address has already been used, a new MAC domain is assigned. However, if the new Unit-unique MAC address has not already been used, a new MAC domain is not assigned. These functions may be performed within each Access Node, thereby enabling each Access Node to assign unique virtual MAC addresses independently, without having to access a centralized database. Alternatively, a centralized database registering the assigned virtual MAC addresses of all units may be implemented to ensure the uniqueness of each locally administered address.

A node that autonomously uses locally assigned MAC addresses is an access point for network traffic, and must respond like any network interface. The interface needs to respond to and manage the mapping of all assigned MAC addresses. The mapped network traffic may originate from sources such as a port, user, or sessions, and the like. Even Ethernet traffic may be remapped through, for example an access node, so that the original MAC address is interchanged with a locally administered virtual MAC address. This can prevent subscriber spoofing and provide the network operator with control of the Ethernet traffic. The mapping is done one-to-one.

The invention is also useful when multiple pieces of test equipment are connected to the same network. If each piece of test equipment is assigned a different locally administered unique virtual MAC address, then each piece of test equipment can send and receive information over the network without affecting the other pieces of test equipment. The virtual MAC address can be generated using an assigned MAC domain 52 or a Unit-unique MAC address field 53 together with a randomly selected unit specific use field 54. In addition, when the test equipment generates a large amount of traffic, each piece of test equipment (unit) can assign its own locally administered MAC addresses based on the test equipment's own Unit-unique MAC address 53.

Figure 6:
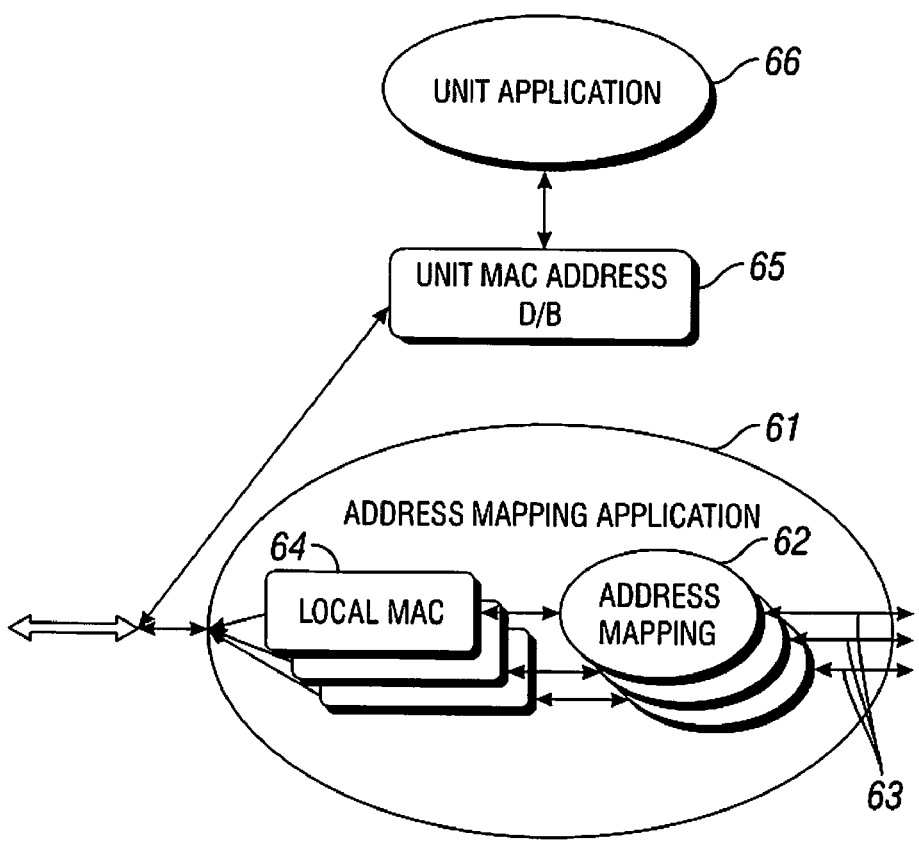
FIG. 6 is a simplified functional block diagram illustrating the functions performed when managing locally administered MAC addresses and mapping Ethernet traffic in a network in which units autonomously utilize locally assigned MAC addresses.

FIG. 6 is a simplified functional block diagram illustrating the functions performed when managing locally administered MAC addresses and mapping Ethernet traffic in a network in which nodes autonomously utilize locally assigned MAC addresses. An address mapping application 61 includes a plurality of address mapping functions 62 that map inbound MAC addresses 63 from inbound Ethernet packets to one of a plurality of assigned locally administered MAC addresses 64. A unit MAC address database 65 that registers all units' MAC addresses is also shown. A unit application 66 for a network node interfaces with the database to validate the node's Unit-unique MAC address against Unit-unique MAC addresses that are already used in other nodes. The application 66 has knowledge about the MAC addresses of all other nodes. This knowledge may be internal to the node, or may be external to the node and may be controlled, for example, by a Public Ethernet Manager (PEM) 79 (see FIG. 7).

In systems in which an Ethernet LAN is accessed by Digital Subscriber Line (DSL), it is desirable to provide a high level of flexibility, enabling an end-user to change the MAC address of end-user equipment. For example, it is desirable for an end-user to be able to purchase a new Ethernet adapter without operator intervention. In order to provide this flexibility, and at the same time avoid any potential MAC addressing spoofing threat, the present invention introduces the use of locally administered unique virtual MAC addresses.

Figure 7:
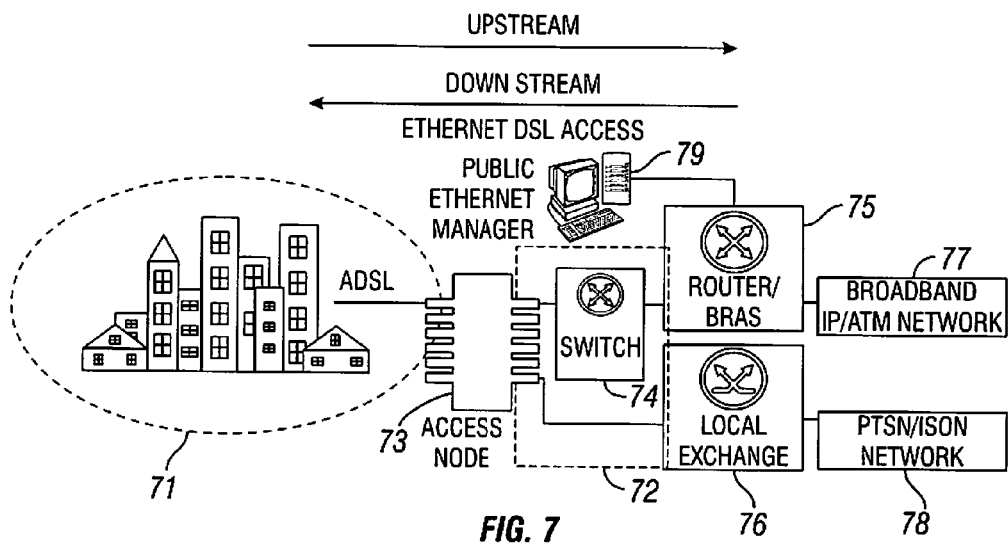
FIG. 7 is a simplified block diagram of a network architecture illustrating an original MAC address domain and a virtual MAC address domain.

FIG. 7 is a simplified block diagram of a network architecture illustrating an original MAC address domain 71 and a virtual MAC address domain 72. Stations in the original MAC address domain access the network using Asymmetric DSL (ADSL) technology. An Access Node 73 maps all original MAC addresses to appropriate virtual MAC addresses. Thus, for upstream traffic, the source MAC address field in the Ethernet frame has a virtual MAC address inserted instead of the original MAC address, while for downstream traffic, the destination MAC address field in the Ethernet frame has the original MAC address inserted instead of the virtual MAC address. Therefore, the original MAC addresses exist only on the tributary (subscriber) side of the Access Node, while virtual MAC addresses exist on the aggregate (network) side of the Access Node. The benefit of this functionality is that the MAC addresses utilized on the network side are controlled solely by the network, and no original MAC addresses can "pollute" the network. This eliminates the MAC address spoofing threat because there cannot be two identical MAC addresses in the network.

The network architecture also includes a switch 74, a router/Broadband Remote Access Server (BRAS) 75, and a local exchange 76. The router/BRAS may connect the network to an external broadband network 77 such as an IP network or Asynchronous Transfer Mode (ATM) network. The local exchange may connect the network to an external telephone network 78 such as the Public Switched Telephone Network (PSTN) or an Integrated Services Digital Network (ISDN). A Public Ethernet Manager (PEM) 79 controls the virtual MAC address domain 72, but is not included in the virtual MAC address domain itself because the virtual MAC addresses are not utilized in the management Virtual LAN (VLAN). The network may also include multiple Access Nodes 73, each of which maps original MAC addresses from different sources onto the same Ethernet network while maintaining the uniqueness of each virtual MAC address.

Figure 8:
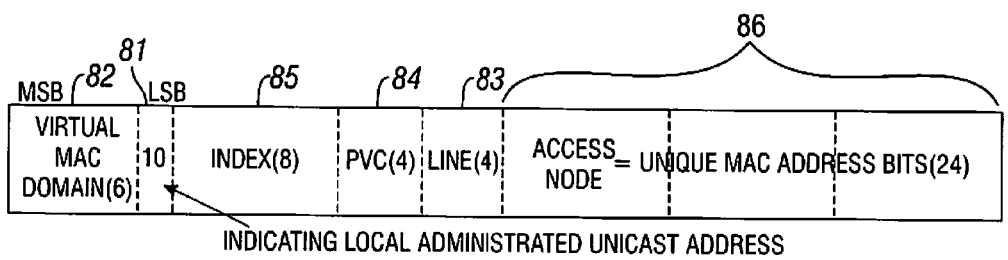
FIG. 8 is an illustration of the layout of a locally administered, virtual MAC address structured in accordance with the teachings of the present invention.

FIG. 8 is an illustration of the layout of an exemplary embodiment of the locally administered, virtual MAC address of FIG. 5, illustrating an exemplary implementation of the unit specific use field 54. The layout of the virtual MAC addresses has been designed in the present invention to provide unique addresses and thus to avoid the possibility of two identical virtual MAC addresses being generated by the Access Node 73 (FIG. 7). The virtual MAC address layout reflects tradeoffs between flexibility and traceability. As shown, the two least significant bits 81 of the first octet are assigned the values "1" and "0" indicating that the address is a locally administered unicast address. The second least significant bit (LSB) is set to "1" indicating that the address is a locally administered address. By setting this bit, the Access Node can administer 46 of the 48 bits in the Ethernet MAC address. It must be ensured, however, that the virtual MAC address never reaches a public network where other special locally administered MAC addresses could cause loss of uniqueness.

The six most significant bits 82 of the first octet are utilized to define a virtual MAC address domain. In order to ensure that a particular Access Node generates unique virtual MAC addresses, half of the Access Node MAC address (the last three octets 86) is inserted in the virtual MAC address. The remaining three octets of the Access Node MAC address (i.e., the Organizationally Unique Identifier (OUI) 31) are not utilized. When installing an Access Node, the PEM 79 should set different virtual MAC domains for Access Nodes that have the three last octets of the MAC address in common. In this manner, it is ensured that the virtual MAC addresses stay unique for approximately one billion network units. It should be noted that the virtual MAC domain is introduced for the purpose of ensuring uniqueness of virtual MAC addresses when equipment or systems from multiple vendors are used in the same Ethernet network utilizing locally administered MAC addresses.

With the bits described above, the virtual MAC address is always unique if a virtual MAC address from one Access Node is compared to an address generated by another Access Node. To provide further distinction of users within a given Access Node, the unit specific use field 54 illustrated in FIG. 5 is divided into a number of fields 83-85. To distinguish each user within a given Access Node, four (Line) bits 83 have been selected to contain the ADSL line number (i.e., either 1-8, 1-10, or 1-12) for each user. Each Permanent Virtual Circuit (PVC) may also be distinguished in the virtual MAC address, and four (PVC) bits 84 have been selected to represent the PVC. To ensure that the end-user can use more than one MAC address with a particular PVC, a remaining octet 85 is used as an index. Three address octets 86 provide an Access Node-unique MAC address.

It should also be noted that in addition to uniqueness, the various fields in the virtual MAC address provide traceability. That is, the location on the network of any user of a virtual MAC address can be precisely determined through the MAC domain 82, the line field 83, the PVC field 84, the index field 85, and the Access Node-unique MAC address bits 86.

Other types of devices can also be used within the network. To ensure uniqueness from other network devices, a different MAC domain 52 (FIG. 5) can be used to denote each type of device. Alternatively, the Unit Specific Use field 54 can be used to denote the device type. The latter, however, will complicate the task of backtracking a given virtual MAC number. Additionally, the index field 85, the PVC field 84, and the Line field 83 (FIG. 8) can be used for different network purposes. For example, if an Access Node or Ethernet switch with 100 ports performs a mapping such as that performed by the Access Node 73 (FIG. 7), the PVC and Line fields may be combined to indicate 256 different ports. The layout of the Unit Specific Use field 54 of the virtual MAC address may be altered as needed since the mapping of the virtual MAC addresses into original MAC addresses (and vice versa) is controlled solely by the Access Node.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. In an Ethernet network, a method of mapping an original Media Access Control (MAC) address to a unique locally administered virtual MAC address, said method comprising the steps of:

utilizing a first portion of the virtual MAC address to define a MAC domain for the address;

utilizing a second portion of the virtual MAC address to indicate that the address is a locally administered address;

utilizing a third portion of the virtual MAC address to indicate a unit-specific use; and utilizing a fourth portion of the virtual MAC address to indicate an organizationally assigned unit-unique MAC address;

wherein the step of utilizing a first portion of the virtual MAC address to define a MAC domain for the address includes defining different MAC domains for units that have the same unit-unique MAC address, thereby ensuring each unit has a unique locally administered virtual MAC address.

2. The method of claim 1, wherein different nodes are assigned different Organizationally Unique Identifiers (OUIs), and the step of utilizing a first portion of the virtual MAC address to define a MAC domain for the address includes defining a different domain for each assigned OUI.

3. The method of claim 1, wherein the step of utilizing a first portion of the node's locally administered MAC address to define a MAC domain includes the steps of:

comparing the unit-unique MAC address against unit-unique MAC addresses that are already used in other nodes; and if the unit-unique MAC address has already been used in another node, defining a new MAC domain for the virtual MAC address.

4. The method of claim 3, wherein the step of comparing the unit-unique MAC address against unit-unique MAC addresses that are already used in other nodes includes accessing a MAC address database that stores MAC addresses for all nodes in the network.

5. The method of claim 1, wherein the original MAC address is received by an address mapping function that maps original MAC addresses from Ethernet packets to one of a plurality of assigned locally administered virtual MAC addresses.

6. In an Ethernet network, a method of mapping an original Media Access Control (MAC) address to a unique locally administered virtual MAC address, said method comprising the steps of:

utilizing a first portion of the virtual MAC address to define a MAC domain for the address;

utilizing a second portion of the virtual MAC address to indicate that the address is a locally administered address;

utilizing a third portion of the virtual MAC address to indicate a unit-specific use; and utilizing a fourth portion of the virtual MAC address to indicate an organizationally assigned unit-unique MAC address;

wherein the unique locally administered virtual MAC address includes six octets, and wherein:

the step of utilizing a first portion of the virtual MAC address to define a MAC domain for the address utilizes the six most significant bits of the first octet of the virtual MAC address to define the domain; and the step of utilizing a second portion of the virtual MAC address to indicate that the address is a locally administered address utilizes the second-least significant bit of the first octet of the virtual MAC address to indicate that the address is a locally administered address.

7. The method of claim 6, wherein the step of utilizing a third portion of the virtual MAC address to indicate the unit-specific use includes utilizing the second and third octets of the virtual MAC address to indicate the unit-specific use.

8. The method of claim 7, wherein the step of utilizing the second and third octets of the virtual MAC address to indicate the unit-specific use includes utilizing fields within the second and third octets to indicate a line number for each user, a Permanent Virtual Circuit (PVC) for each user, and an index for each virtual MAC address utilized for each PVC.

9. In an Ethernet network, an access node for mapping an original Media Access Control (MAC) address to a unique locally administered virtual MAC address, said access node comprising:

means for receiving an Ethernet frame having an original MAC address;

means for defining a MAC domain for the virtual MAC address utilizing a first portion of the virtual MAC address;

means for indicating that the address is a locally administered address utilizing a second portion of the virtual MAC address;

means for denoting a unit-specific use utilizing a third portion of the virtual MAC address;

means for denoting an organizationally assigned unit-unique MAC address utilizing a fourth portion of the virtual MAC address;

means for replacing the original MAC address in the Ethernet frame with the virtual MAC address; and means for transmitting the Ethernet frame with the virtual MAC address to a destination node utilizing the virtual MAC address;

wherein the means for defining a MAC domain for the virtual MAC address includes means for defining different MAC domains for nodes that have the same unit-unique MAC address, thereby ensuring each node has a unique locally administered virtual MAC address.

10. The access node of claim 9, further comprising:

a MAC address database for storing unit-unique MAC addresses for all nodes in the network;

means for accessing the MAC address database and for comparing the unit-unique MAC address against unit-unique MAC addresses that are already used in other nodes; and means for defining a new MAC domain for the original MAC address if the unit-unique MAC address has already been used in another node.

11. In an Ethernet network, an access node for mapping an original Media Access Control (MAC) address to a unique locally administered virtual MAC address, said access node comprising:

means for receiving an Ethernet frame having an original MAC address;

means for defining a MAC domain for the virtual MAC address utilizing a first portion of the virtual MAC address;

means for indicating that the address is a locally administered address utilizing a second portion of the virtual MAC address;

means for denoting a unit-specific use utilizing a third portion of the virtual MAC address;

means for denoting an organizationally assigned unit-unique MAC address utilizing a fourth portion of the virtual MAC address;

means for replacing the original MAC address in the Ethernet frame with the virtual MAC address; and means for transmitting the Ethernet frame with the virtual MAC address to a destination node utilizing the virtual MAC address;

wherein the unique locally administered virtual MAC address includes six octets, and wherein the first portion of the virtual MAC address that is utilized to define the MAC domain is the six most significant bits of the first octet of the virtual MAC address.

12. The access node of claim 11, wherein the second portion of the virtual MAC address that is utilized to indicate that the address is a locally administered MAC address is the second-least significant bit of the first octet of the virtual MAC address.

13. The access node of claim 12, wherein the third portion of the virtual MAC; address that is utilized to denote a unit specific use includes a second and third octet of the virtual MAC address.

14. A method of preventing subscriber spoofing in an Ethernet network comprising the steps of:

mapping an original Media Access Control (MAC) address to a locally administered virtual MAC address; and ensuring the locally administered virtual MAC address is unique by:

utilizing a first portion of the virtual MAC address to define a MAC domain for the address;

utilizing a second portion of the virtual MAC address to indicate that the address is a locally administered address;

utilizing a third portion of the virtual MAC address to indicate a unit-specific use; and utilizing a fourth portion of the virtual MAC address to indicate an organizationally assigned unit-unique MAC address;

wherein the step of utilizing a first portion of the virtual MAC address to define a MAC domain for the address includes defining different MAC domains for units that have the same unit-unique MAC address, thereby ensuring each unit has a unique locally administered virtual MAC address.

* * * * *